United States Patent Office
3,086,002
Patented Apr. 16, 1963

3,086,002
QUATERNIZED WATER-SOLUBLE BASIC DYESTUFFS
Hans Baumann and Dieter Leuchs, Ludwigshafen (Rhine), Germany, assignors to Badische Anilin- & Soda-Fabrik Aktiengesellschaft, Ludwigshafen (Rhine), Germany
No Drawing. Filed Dec. 2, 1958, Ser. No. 777,570
Claims priority, application Germany Dec. 4, 1957
6 Claims. (Cl. 260—146)

This invention relates to novel water-soluble basic dyestuffs and, in particular, to an improved dyestuff containing a thiazole or benzthiazole group in which the nitrogen atom in the 3-position of the thiazole ring has been quaternized to provide a basic or cationic dye.

Basic dyestuffs are known in the art, but in many respects these dyestuffs must be improved to provide those properties or qualities which are most desirable in commercial dyeing operations, especially in the dyeing and printing of various filamentary materials including staple fibers, fabrics, felts and the like. One object of the present invention is to provide basic dyestuffs having a markedly improved solubility in water. Another object of the invention is to provide improved basic dyestuffs which can be used for dyeing a large number of natural and synthetic fibers and which will give very fast and excellent shades of color. Other objects and advantages of the invention will become more apparent in the following disclosure.

In accordance with the invention, novel and improved dyestuffs have been obtained when a 1.3-thiazolinium-(3) compound is azo coupled in its 2-position to a cyclic amidine through a secondary or tertiary amine coupling component in which azo coupling occurs with one N-substituent of the coupling component while the cyclic amidine is connected to another N-substituent, the amino coupling component containing not more than one hydrogen atom upon the amino nitrogen atom.

A particular characteristic of the new dyestuffs is their excellent solubility in water and their basic or cationic nature resulting from the presence of amino groups and quaternary ammonium groups. The dyestuffs of the invention are further characterized by the absence of any other ionogenic groups in the dyestuff molecule.

The preferred water-soluble basic dyestuffs can be more particularly represented by one of the generic formulae

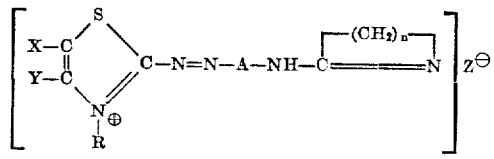

which in its tautomeric form is represented by (I')

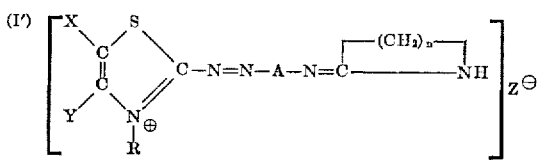

or (II)

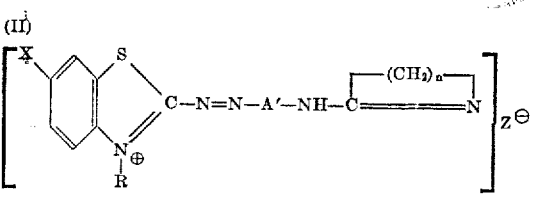

which in its tautomeric form is represented by (II')

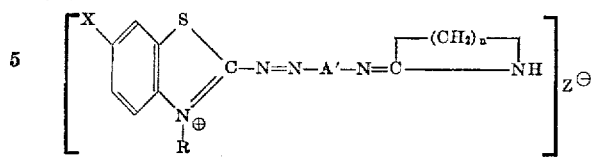

in which: Y represents a member selected from the group consisting of alkyl containing from 1 to 8 carbon atoms and phenyl; X represents a member selected from the group consisting of hydrogen, methyl, methoxy, ethoxy, acetylamino, phenylamino, methylsulfonyl and chloro; R represents a member selected from the group consisting of lower alkyl and benzyl; $n$ is an integer of from 3 to 7; $Z^{\ominus}$ represents an anion, e.g. an anion selected from the group consisting of $Cl^{\ominus}$, $Br^{\ominus}$, $ZnCl_3^{\ominus}$, $ZnBr_3^{\ominus}$, $HSO_4^{\ominus}$, $H_2PO_4^{\ominus}$, $CH_3SO_4^{\ominus}$, and

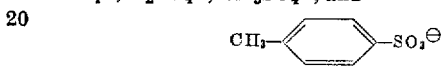

A represents a divalent radical of the coupling component

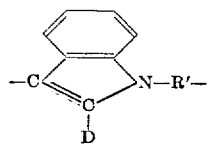

wherein D represents a radical selected from the group consisting of methyl and phenyl; and A' represents a divalent radical selected from the group consisting of the coupling components (a)

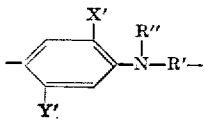

(b)

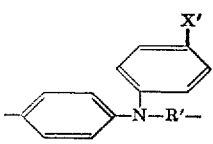

(c)

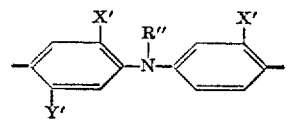

(d)

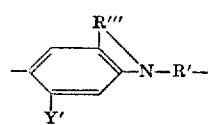

wherein R' represents saturated lower alkylene containing at least two carbon atoms, R" represents a member selected from the group consisting of hydrogen and lower alkyl, R''' represents saturated lower alkylene containing from 2 to 3 carbon atoms, X' represents a member selected from the group consisting of hydrogen, lower alkyl and lower alkoxy and Y' represents a member selected from the group consisting of hydrogen, lower alkyl, lower alkoxy, chloro and acetylamino.

Formulae I and II above represent one tautomeric form of the dyestuffs while the other tautomeric form is represented by I' and II', respectively. For the sake of simplicity, the dyestuffs are represented hereinafter, in both the specification and claims, by Formulae I and II. It will be understood that this designation of the dyestuff is intended also to include Formulae I' and II'.

The improved properties and qualities of the dyestuffs of this invention are believed to be primarily attributed to the cyclic amidine group connected to a 2-aminothiazole or its benzene-substituted derivative by means of the phenyl amino coupling compound. The cyclic amidine essentially appears in the dyestuff in one of the following forms

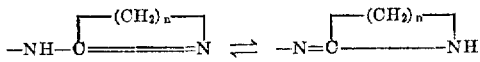

wherein $n$ is an integer of from 3 to 7, e.g. azapentane, azahexane, azaheptane, azaoctane and azanonane.

The nitrogen atom of the thiazole ring is preferably quaternized by a lower alkyl or aralkyl group, e.g., methyl, ethyl, propyl, isopropyl, the isomeric butyl radicals, the benzyl radical, and the like, containing from 1 to 8 carbon atoms. It will be understood, however, that this quaternizing group may also be an aliphatic radical provided that the hydrocarbon structure contains only non-ionogenic substitutents and does not contain ionogenic substitutents. Those skilled in the art can readily select suitable quaternizing groups and such selection will ordinarily be governed by the most convenient method of introducing such group. In the above general formula, X and Y or X' and Y' may be selected from a large number of non-ionogenic substituents and X and Y or X' and Y' may have the same or a different meaning in the formula. Non-ionogenic substituents employed within the scope and meaning of the invention include hydrogen; alkyl radicals which preferably contain from 1 to 8 carbon atoms; cycloalkyl radicals such as cyclohexyl; and lower alkoxy groups such as methoxy, ethoxy and propoxy; further non-ionogenic substituents include nitro; cyano; arylamino, alkyl sulfone; the halogens, fluorine, chlorine, bromine, or iodine; and various acylated amino groups such as acetylamino, propionylamino or benzylamino. As a non-ionogenic substituent, X and Y may also be an aromatic radical, preferably a benzene substituent which in turn can be further substituted by the said non-ionogenic groups. Other combinations of non-ionogenic substituents can be obtained where alkoxy, nitro, cyano, acyl amino, arylamino, alkyl sulfone and halogen groups are connected to an aliphatic, alkoxy or aromatic substituent.

The following are examples of 1.3-thiazole radicals appearing in the above general formula in which the azo group is coupled in the 2-position and in which the nitrogen atom of the thiazole is quaternized: 4.5-dimethylthiazole, 4-phenylthiazole, 4-(3'-nitro)-phenylthiazole, 5-nitrothiazole, 5-cyanothiazole, benzthiazole, 6-methylbenzthiazole, 6-methoxybenzthiazole, 6-ethoxybenzthiazole, 4-methyl-6-chlorbenzthiazole, 6-chlorbenzthiazole, 6-phenylaminobenzthiazole, 6-acetylaminobenzthiazole, 4-methylthiazole, 6-sulfomethylbenzthiazole, 7-ethoxybenzthiazole. These 1.3-thiazole radicals, which can be identified as 1.3-thiazolinium-(3) radicals upon quaternization of the nitrogen atom, represent the "diazotized component" of the new basic dyestuffs. The expressions "a 1.3-thiazole" and "a 1.3-thiazolinium-(3)" are employed herein to represent both the simple thiazoles, the benzthiazoles, and their non-ionogenic substituted derivatives.

The dyestuffs of the invention can be prepared by a conventional azo coupling reaction in which the diazotized component is first obtained by diazotizing a 2-amino-1.3-thiazole. After coupling an amino-cyclic amidine compound, the resulting dyestuff is converted by quaternization into its water-soluble salt. Alternatively, the dyestuffs can be prepared by employing a hydrazone as the starting material, i.e., a thiazolone-2-hydrazone or a benzthiazolone-2-hydrazone alkylated in the 3-position, and oxidizing in the presence of the coupling compound containing a cyclic amidine group. This latter method is more fully described in the copending application, Serial No. 519,674, filed July 1, 1955. It will be understood that the term "diazotized component" is employed herein with reference to any of the 1.3-thiazoles having an azo group in the 2-position, even though obtained from a hydrazone.

The following diazotizable amines may be used as initial reactants for preparing the diazotized component: 2-aminothiazole, 2-amino-4.5-dimethylthiazole, 2-amino-4-phenylthiazole, 2-amino-4-(3'-nitro)-phenylthiazole, 2-amino-5-nitrothiazole, 2-amino-5-cyanothiazole, 2-aminobenzthiazole, 2-amino-6-methylbenzthiazole, 2-amino-6-methoxybenzthiazole, 2-amino-6-ethoxybenzthiazole, 2-amino-4-methyl-6-chlorobenzthiazole.

Suitable hydrazones which can be employed in the oxidizing method are as follows: 3-methyl-4-phenylthiazolene-2-hydrazone, 2-methylbenzthiazolone-2-hydrazone, 3-ethylbenzthiazolone-2-hydrazone, 3-methyl-6-methoxybenzthiazolone-2-hydrazone, 3-methyl-6-chlorobenzthiazolone-2-hydrazone, 3-methyl-6-phenylaminobenzthiazolone-2-hydrazone, 3-methyl-6-acetylaminobenzthiazolone-2-hydrazone.

The coupling component, as represented by A in the above general formula taken with the cyclic amidine, is a secondary or tertiary amine capable of coupling with the azo group of the 1.3-thiazole. Coupling occurs with one N-substituent of the amine, the cyclic amidine group being connected through another N-substituent of the amine. The coupled N-substituent is preferably a phenyl radical which can be substituted by non-ionogenic groups as defined herein above. Other N-substituents capable of coupling with a diazonium or a hydrazone component as defined above can also be employed, e.g. naphthalene radicals or a radical of a heterocyclic compound in which the heterocyclic atom is the nitrogen atom of the amine, e.g., indole, quinoline, tetrahydroquinoline, quinaldine, hexahydrocarbazole or the indole derivatives substituted in the 1- and 2-positions by lower alkyl or aryl groups.

The cyclic amidine is preferably connected to the amino nitrogen through an arylene group or a lower alkyl chain, either of which can be substituted by non-ionogenic substituents. Ordinarily, the alkyl chain should preferably contain from 2 to 4 carbon atoms; it may be substituted by a hydroxy group or by other non-ionogenic substituents as defined above. The arylene group is preferably a divalent phenyl radical in which the exterior nitrogen atom of the cyclic amidine is connected in para-position to the amino nitrogen atom.

In general, it may be stated that the amino-containing coupling compound meets with the requirements of the novel dye-stuffs provided that it is capable of coupling with the azo group and provided that the cyclic amidine is connected by its exterior nitrogen atom to the amino nitrogen atom by a carbon chain containing at least two carbon atoms and preferably in general not more than four carbon atoms. In accordance with the above definition of the coupling component, the symbol A in the general formula is preferably a member of the group designated by one of the following formulae:

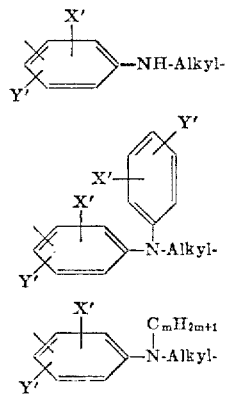

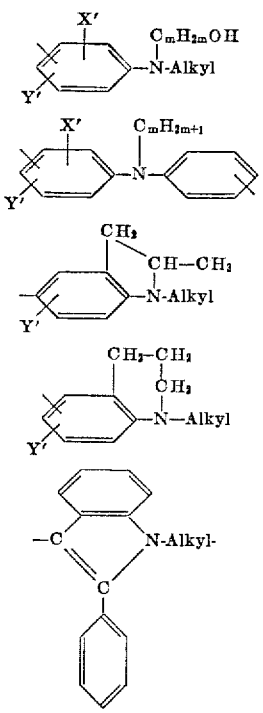

wherein X' and Y' are non-ionogenic substituents selected from the group consisting of hydrogen and lower alkyl and alkoxy groups, especially methyl, ethyl, methoxy and ethoxy groups, and $m$ is preferably an integer of from 1 to 4, inclusive.

As suitable coupling compounds, there may be used the reaction products of lactim-O-alkyl ethers with aromatic or heterocyclic amines. The lactim-O-alkyl ethers have the general formula $$\text{alk-O-C} \overset{\overset{\displaystyle -(CH_2)_n-}{\phantom{x}}}{=\!=\!=\!=\!=} N$$

wherein alk is a lower alkyl radical and $n$ is an integer of from 3 to 7, so as to correspond to the desired cyclic amidine in the dyestuff. In general, useful amines correspond to the symbol A in the above general formula including its N-substituents, at least one of which contains a basic nitrogen atom which then becomes the exterior nitrogen atom of the cyclic amidine. Suitable amines are, for example N-phenylethylenediamine, N-(3-methylphenyl)-ethylenediamine, N-methyl-N-phenylethylenediamine, N-ethyl-N-(3-methoxy-phenyl)-ethylenediamine, N-(2-hydroxy-ethyl)-N-(2-methoxy-5-methylphenyl)-ethylenediamine, N-butyl-N-phenyl-1.3-diaminopropanol-(2), N-(β-aminopropyl)-diphenylamine, N-(β-amino-ethyl)-4-ethoxy-diphenylamine, 4-(γ-aminopropyl)-amino-diphenylamine, 1-(γ-aminopropyl)-2-methylindole and 1-(γ-aminopropyl)-3-hydroxy-1.2.3.4-tetrahydroquinoline.

The anions associated with the cationic dyestuff are of any kind; they can be derived from inorganic or organic acids, e.g. Cl$^-$, Br$^-$, ZnCl$_3^-$, ZnBr$^-$, HSO$_4^-$ or H$_2$PO$_4^-$ or by way of illustration the methosulfate anion or the anion of toluenesulfonic acid.

The new dyestuffs are suitable for dyeing and printing various natural and synthetic fibers such as cotton mordanted with tannic acid, cellulose acetate, polyamides, polyurethanes and polyesters. Very fast dyeings can be obtained with these dyestuffs, especially with polymers or copolymers of acrylonitrile, especially the copolymers containing at least 40% of acrylonitrile, or of dicyanoethylene. When compared with similar dyestuffs which do not contain the cyclic amidine group, the new dyestuffs exhibit a pronounced improvement in their water-solubility. At the same time, the presence of the cyclic amidine group often causes a very desirable bathochromic displacement in color shade.

The dyeing procedures employed with the new dyestuffs are those conventionally used in the art, depending upon the particular type of fiber being dyed. Because of their high solubility in water, aqueous baths are especially useful for dispersing the dyestuff. A few dyeing procedures are indicated in the following example.

The following example will further illustrate this invention but the invention is not restricted to this example. The parts specified in the example are parts by weight:

*Example*

A solution of 26 parts of the condensation product of caprolactim-O-methyl ether and N-methyl-N-(3-methyl)-phenylethylene diamine in 200 parts of methanol is added to a solution of 22 parts of 3-methylbenzthiazolone-2-hydrazone hydrochloride in 300 parts of water, and into the resulting mixture there are allowed to flow at normal temperature 240 parts of 35% aqueous ferric chloride solution. After the reaction has ended, the dyestuff solution formed is diluted with an equal volume of saturated sodium chloride solution and 40 parts of 50% zinc chloride solution are allowed to flow in. The dyestuff thus precipitated is filtered off by suction, washed on the filter with sodium chloride solution and dried in vacuo at 50° C. It is obtained in an amount of 78 parts. It has the formula

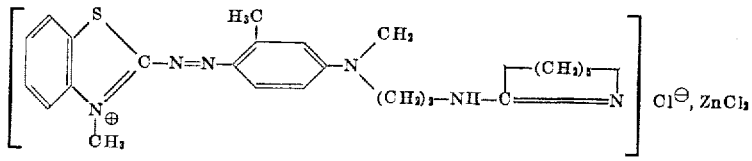

dissolves in water with a violet-blue color and dyes fibers of polyacrylonitrile or acrylonitrile-containing copolymers in very fast reddish blue shades.

In a corresponding way there may be prepared, inter alia, the following dyestuffs which also give fast dyeings on fibers containing acrylonitrile (the shades of color obtainable on these fibers also being indicated):

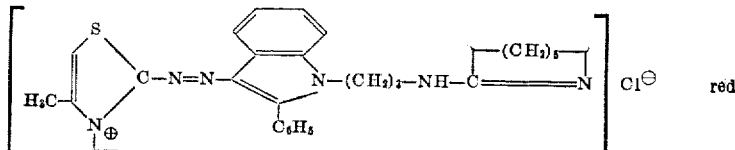 red

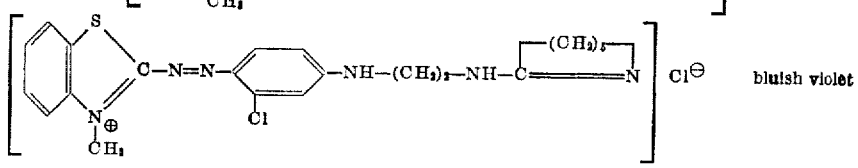 bluish violet

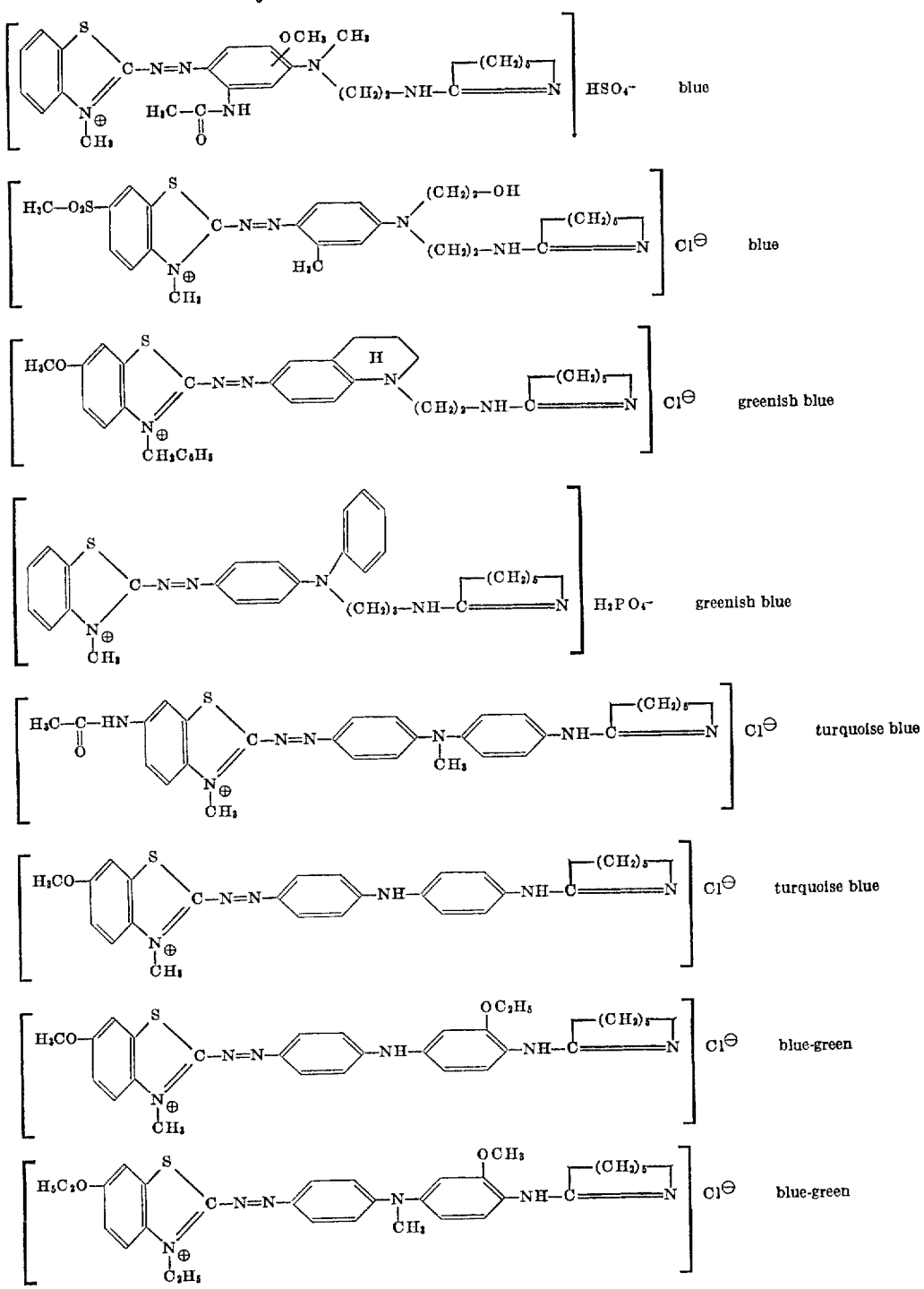

We claim:
1. A water-soluble basic dyestuff selected from the group consisting of

(I)

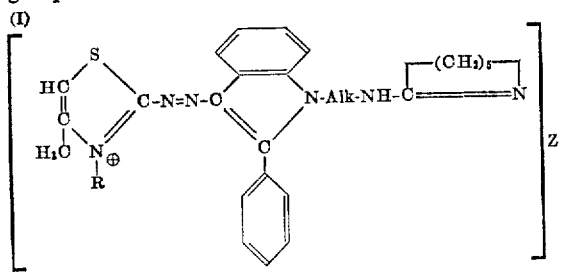

and

II

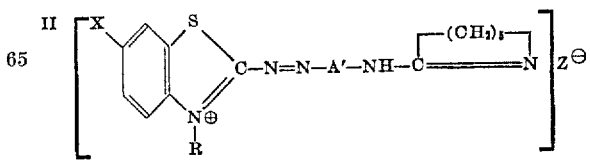

in which: X represents a member selected from the group consisting of hydrogen, methoxy, ethoxy, acetylamino and methylsulfonyl; R represents a member selected from the group consisting of lower alkyl and benzyl; Alk represents saturated lower alkylene containing at least two carbon atoms; Z represents an anion; and A' represents a divalent radical selected from the group consisting of (a)

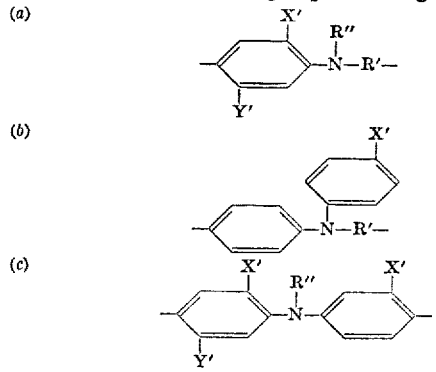

(b)

(c)

(d)

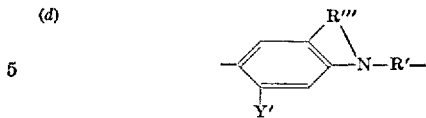

wherein R' represents saturated lower alkylene containing at least two carbon atoms, R'' represents a member selected from the group consisting of hydrogen and lower alkyl, R''' represents saturated lower alkylene containing from 2 to 3 carbon atoms, X' represents a member selected from the group consisting of hydrogen and lower alkoxy and Y' represents a member selected from the group consisting of hydrogen, lower alkyl, chloro and acetylamino.

2. The water-soluble basic dyestuff of the formula

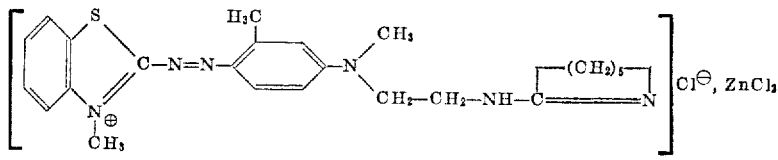

3. The water-soluble basic dyestuff of the formula

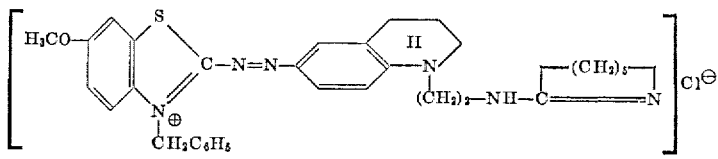

4. The water-soluble basic dyestuff of the formula

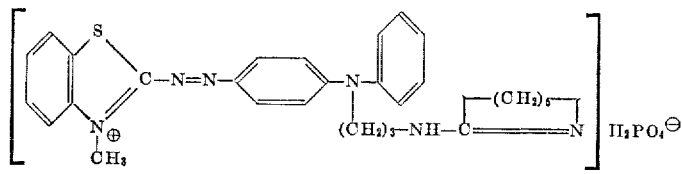

5. The water-soluble basic dyestuff of the formula

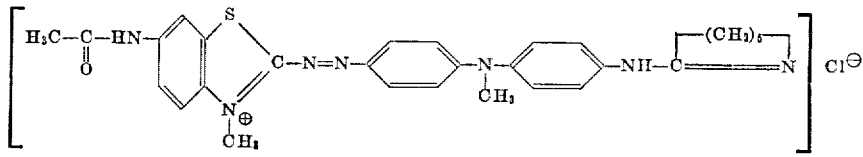

6. The water-soluble basic dyestuff of the formula

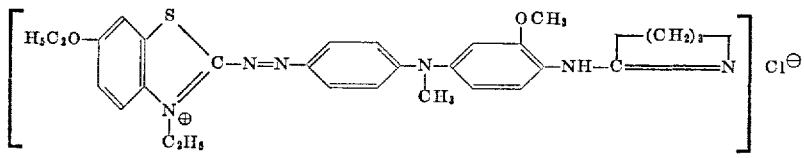

No references cited.

UNITED STATES PATENT OFFICE
CERTIFICATE OF CORRECTION

Patent No. 3,086,002 April 16, 1963

Hans Baumann et al.

It is hereby certified that error appears in the above numbered patent requiring correction and that the said Letters Patent should read as corrected below.

Column 4, line 16, for "2-methylbenzthiazolone-" read -- 3-methylbenzthiazolone- --.

Signed and sealed this 31st day of December 1963.

(SEAL)
Attest:
ERNEST W. SWIDER

Attesting Officer

EDWIN L. REYNOLDS

Acting Commissioner of Patents